United States Patent [19]
Walker

[11] 3,988,980
[45] Nov. 2, 1976

[54] SAFETY GUARD STRUCTURE
[76] Inventor: Brooks Walker, 807 Francisco St., San Francisco, Calif. 94109
[22] Filed: Aug. 29, 1975
[21] Appl. No.: 608,922

[52] U.S. Cl............................. 100/53; 49/258; 74/612; 83/544; 312/138 R
[51] Int. Cl.² .......................................... B30B 15/00
[58] Field of Search.................. 49/254, 255, 258; 100/53; 83/DIG. 1, 397, 543, 544, 546; 74/612, 616; 192/133, 134, 135; 425/151; 312/138

[56] References Cited
UNITED STATES PATENTS

| | | | |
|---|---|---|---|
| 1,447,987 | 3/1923 | Johnson | 74/612 |
| 2,407,527 | 9/1946 | Anstedt | 74/612 |
| 3,654,821 | 4/1972 | Mikulin | 100/53 |
| 3,820,282 | 6/1974 | Kornylak | 49/255 |

FOREIGN PATENTS OR APPLICATIONS

| | | | |
|---|---|---|---|
| 798,758 | 7/1958 | United Kingdom | 74/616 |

Primary Examiner—Billy J. Wilhite
Attorney, Agent, or Firm—Gordon Wood

[57] ABSTRACT

A safety guard structure for protecting personnel from injury while operating a machine such as a punch press. The guard member is supported at three points for vertical movement between upper and lower positions. At two upper points the guard is supported on rollers which roll on vertically extending parallel guides and at one lower point the guard is centrally supported on the lower end of a vertically extending rod slidable in fixed bearings. The resulting structure is not only economical to build but gives optimum guiding effect for the guard. The embodiment disclosed permits the entire guard structure to be swung outwardly to a position permitting access to the machine above the protected area.

4 Claims, 3 Drawing Figures

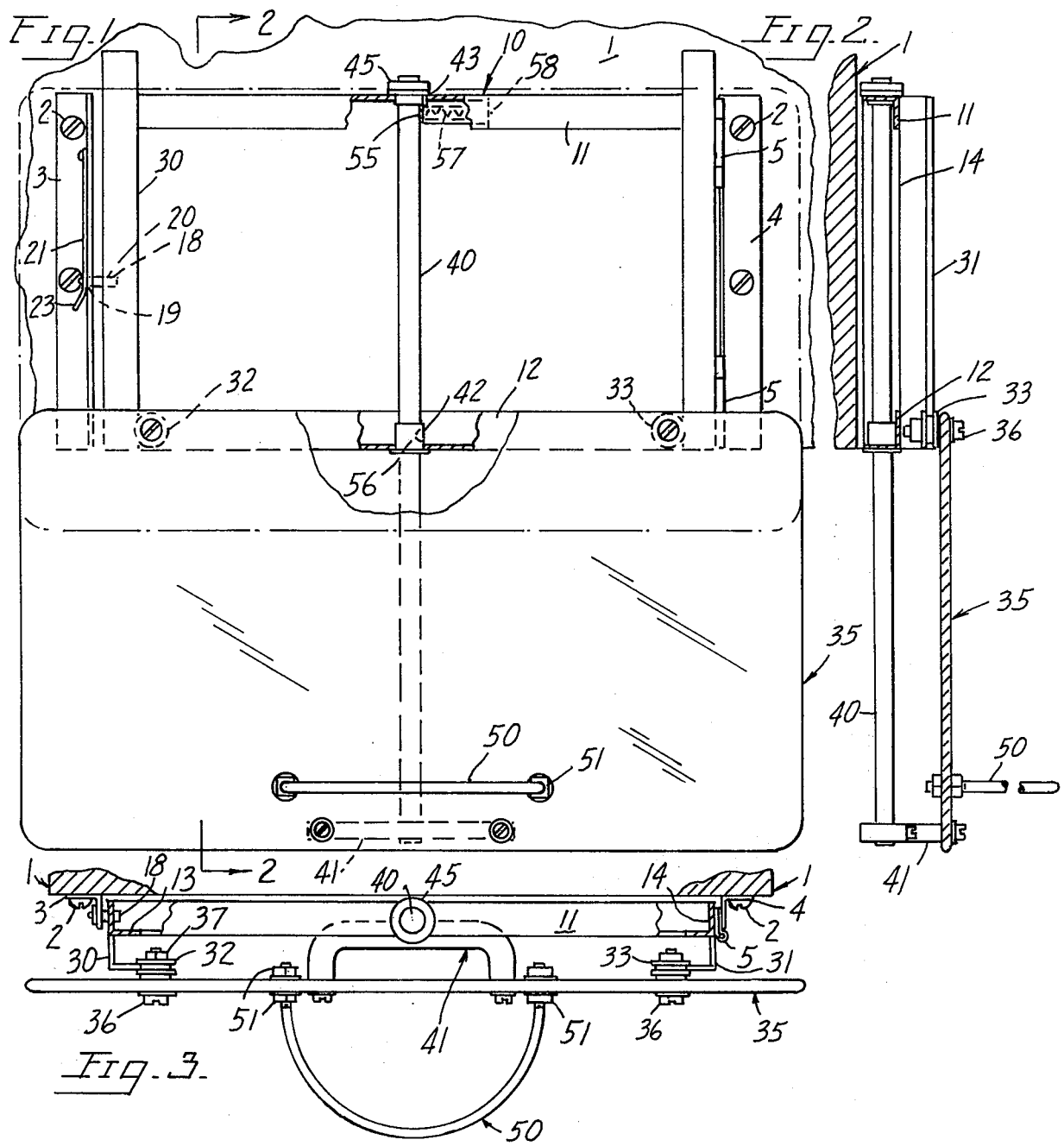

SAFETY GUARD STRUCTURE

This invention relates to a safety guard structure which includes a guard member adapted to be interposed between a mechanism such as a punch press and the operator thereof so as to prevent injury to the operator while the mechanism is running.

The main object of the present invention is to provide a safety guard structure which is economical to build and which at the same time operates more efficiently and smoothly than prior art guards of like nature.

Other objects and advantages will be apparent from the following specification, and from the drawings.

FIG. 1 is a fragmentary front elevation of a punch press or like mechanism showing the invention mounted thereon. Portions of the drawing are broken away to show internal structure.

FIG. 2 is a vertical cross section through the guard structure as taken in a plane indicated by lines 2—2 of FIG. 1.

FIG. 3 is a top plan view of the structure of FIG. 1.

In detail, and first with reference to FIG. 1 a portion of the front face of a punch press or like mechanism is shown at 1. Secured to said front face of said mechanism as by screws 2 are a pair of vertically extending angle bars 3,4. Swingably secured to the outwardly extending leg of angle bar 4 by hinges 5 is a rectangular frame generally designated 10 which comprises upper and lower horizontally extending angle bars 11, 12 and vertically extending angle bars 13, 14. Said angle bars 11–14 are welded together at their ends to form a rigid frame and said frame is held in its working position by means of a pin 18 which is received through a hole 19 in the outwardly extending leg of angle bar 3 and which also extends through a hole 20 in the adjacent leg of angle bar 13. Said pin 18 is supported at the lower end of a vertically extending leaf spring 21 which is secured at its upper end to angle bar 3. The leaf spring 21 is bent at its lower end as indicated at 23 to permit the operator to pull the pin 20 outwardly so as to release the frame 10 to permit the same to be swung about hinges 5 to a position completely clear of the mechanism being guarded. By this structure access to the mechanism at points above the guarded area is permitted which is desirable in many instances.

Fixedly secured as by welding to the vertically extending angle bars 13, 14 are a pair of similar angle bars 30, 31 which are arranged with their corresponding legs directed toward each other so as to provide guides for rollers 32, 33. These rollers are rotatably secured adjacent the upper edge of a generally rectangular guard member generally designated 35. This guard member is preferably formed of tough transparent plastic so as to permit the operator to view the operation of the mechanism therethrough. The rollers 32, 33 may be secured to the guard 35 by means of screws 36, and nuts 37 and may be provided with suitable bearings such as ball bearings.

Adjacent the lower edge of guard member 35 the same is centrally secured to a vertically extending rod 40 by means of a bracket 41. The rod 40 extends through a sleeve bearing 42 carried by lower angle bar 12 and also through another sleeve bearing 43 secured to upper angle bar 11. The guard member 35 is shown in its lower position in FIG. 1, in which position further downward movement is prevented by a stop 45 secured adjacent the upper end of rod 40 and adapted to abut bearing 43.

In order to permit manual manipulation of the guard member 35, a semicircular handle generally designated 50 is provided and which handle may be threaded at its ends to permit securement to the guard member 35 by means of nuts 51. The guard may be held in its upper position by means of a spring urged ball 55 which is adapted to be partially received within a spherical recess 56 in rod 40. The ball 55 is urged to an outer position by means of a spring 57 mounted within a housing 58 secured to the upper angle bar 11.

At this point it will be noted that in operation the guard 35 may be pulled downwardly to the operative position of FIG. 1 by means of the handle 50. When it is desired to obtain access to the mechanism, when the latter is stopped, the guard 35 may be moved to its upper position shown in dot-dash lines by means of handle 50 so that it is held in said upper position by spring pressed ball 55. The resistance offered by ball 55 is sufficient to hold the guard in the upper position but such resistance is readily overcome by pulling downwardly on the handle to move the guard member to its lower operative position.

A substantial advantage of the above described structure is that the guard 35 has an extremely stable three point support. Said three points being at the two rollers 32, 33 and at bracket 41. Furthermore the guiding effect of rod 40 in bearings 42, 43 which supplements the guiding effect of rollers 32, 33 completely obviates any tendency of the sliding structure to cock or bind in any way. It will also be noted that decided economies are effected by means of the simple structure disclosed.

In some instances it is necessary, because of obstructions on the front face of the mechanism 1 to tilt the upper end of the mechanism outwardly so as to clear certain items on said front face. It will be apparent that the safety guard structure may readily be tilted out by modifying angle bars 3,4.

As noted above the structure permits swinging the entire assembly outwardly from the front face of the mechanism at points above the area to be guarded. It will also be noted that the guard actuating means is entirely above the guarded area. By this structure damage to the structure is minimized as when it is necessary to employ a lift truck to change a heavy die for example.

It will be understood that the presence of the rod 40 centrally over the protected area of the guard does not obstruct the view of the operator if the latter has normal sight in both eyes. It will also be noted that, aside from the guard 35, only the rod 40 enters the area to be protected and the remaining structure is all above said area at all times.

It will be apparent that the device may be operated by a fluid driven cylinder if desired. In such a case the piston rod of the cylinder will be, in effect, an upward extension of rod 40.

I claim:

1. A safety guard structure adapted to be interposed at an area between a mechanism and an operator spaced from said mechanism for protecting said operator, comprising:
    a generally rectangular planar generally vertically disposed guard member having a lower position registering with said area
    a pair of vertically elongated horizontally spaced apart parallel guides above said area one pair only of rollers mounted on said member adjacent its upper edge and in rolling engagement with said guides, a single vertically extending rod positioned intermediate said guides and secured at its lower end to said guard member, a pair of vertically spaced fixed bearings above said area and in which said single rod is slidably received, whereby said guard member may be moved from an upper position spaced upwardly from said area to a lower position covering said area and spaced downwardly from said guides and bearings.

2. A guard structure according to claim 1 wherein means is provided for connecting said guides and bearings as a unit, and hinge means for permitting said unit to be swung in a horizontal plane to a position horizontally spaced from its operative position.

3. A guard structure according to claim 1 wherein holding means is provided for holding said guard member in its upper position.

4. A guard structure according to claim 1 wherein said guides, and rollers are always above said area whereby only the guard member and said rod enter said area.

* * * * *